May 10, 1966
A. H. SCHUTTE
3,250,696
PNEUMATIC SOLIDS TRANSFER IN A CONVERSION PROCESS
Filed April 27, 1956
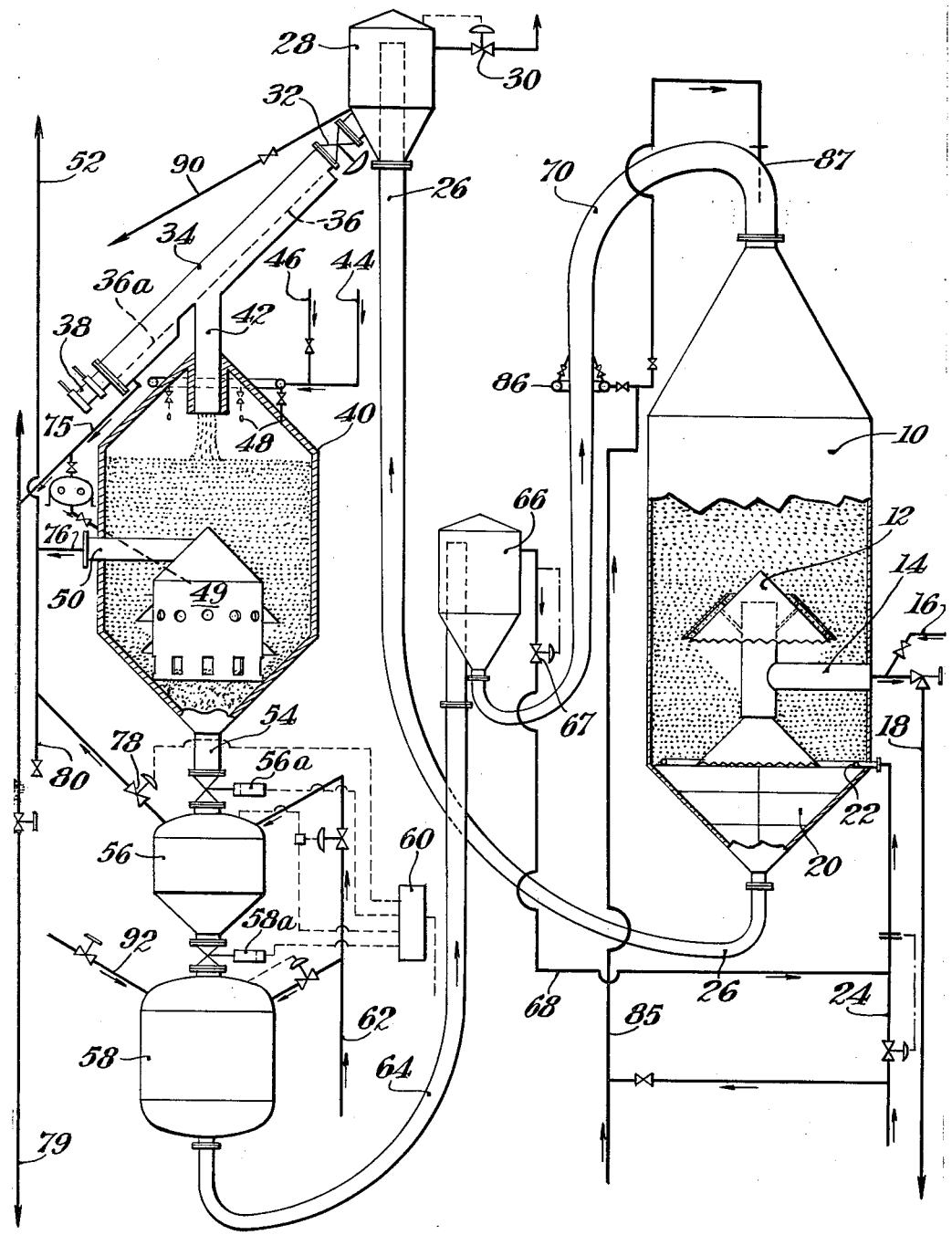
INVENTOR
*August Henry Schutte*
BY
*Nathaniel Ely*
ATTORNEY United States Patent Office 3,250,696
Patented May 10, 1966

3,250,696
PNEUMATIC SOLIDS TRANSFER IN A
CONVERSION PROCESS
August H. Schutte, Hastings on Hudson, N.Y., assignor to The Lummus Company, New York, N.Y., a corporation of Delaware
Filed Apr. 27, 1956, Ser. No. 581,246
7 Claims. (Cl. 208—126)

This application is a continuation-in-part of my copending application Serial No. 252,306, filed October 20, 1951, now abandoned, and is a modification of the invention shown in my U.S. Patent 2,658,031 and U.S. Patent 2,701,788 and U.S. Patent 2,561,334 of which I am co-inventor.

This invention relates to the continuous conversion of heavy liquid hydrocarbon to coke and vaporous material in the presence of a continuously moving gravity packed column of coke particles which serve to supply the required heat for the reaction and become coated with a residual carbon, the vaporous materials being separately withdrawn for further cracking or other treating as desired.

It is now known that moving columns of gravity packed granular material serve as an excellent heat transfer medium for carrying out various physical and chemical conversions. Such systems can be and are being used for catalytic reactions particularly in vapor phase operations and as described in the above patents, the operation can also be utilized with a liquid charge. Certain care must be used in maintaining a uniform feed and it is important that deviations from an average temperature at any one region be avoided. Every effort must also be made to have the contact material move through the reaction zone at a uniform rate.

My present invention is primarily concerned with a continuous coking system of this type in which the reaction may be carried out at a super atmospheric pressure of several atmospheres while the regeneration and reheating of the contact particles is accomplished at substantially atmospheric pressure. The increased reaction pressure improves the yield of products and, as hereinafter described, the gases may be used for transfer of the solids thereby avoiding the need of elevators, etc.

My invention also contemplates and has for a major object, the transfer of solid particles of contact material between reaction or contact zones operating under different optimum pressures in which the transfer system seals the respective reaction zones one from another.

Further objects and advantages of my invention will appear from the following description of a preferred form of embodiment thereof, taken in connection with the attached drawing in which the figure is a schematic elevation with parts in section of the major elements in accordance with my continuous coking system.

A continuous coking cycle utilizing a gravity flowing mass of granular particles as disclosed in the above identified patents includes a heating of the granular petroleum coke particles which are ultimately made in the system and the passage of such particles through a closed path to a reactor through which the particles pass downward by gravity. The liquid hydrocarbon charge which may be any residual oil regardless of gravity or boiling range is uniformly distributed over the particles and is converted by the heat of the particles to produce lower boiling vapors and a dry coke coating on the particles. At least five minutes, and in some cases as much as 40 minutes coke travel time, is required to convert the heavy ends to a completely free flowing dry bed of coke, part of which is removed as product with the balance recycled back through another closed path to the heater for reuse.

More specifically, in accordance with my present invention, the reactor is indicated at 10 and is normally a tall cylindrical vessel to which the coke particles and liquid charge are continuously fed at the top and through which the particles travel downward solely by gravity while the liquid is converted to the dry coating on the coke particles. The vapors may be removed from under a suitable disengager 12 and thence out through the outlet 14 to which quench liquid may be introduced at 16. The relatively light end products in gaseous form are then removed at 18 and passed to a fractionator as is well known. Suitable pressure controls, not shown, will be provided to maintain a pressure in the reactor of about several atmospheres and generally from 15 to 100 p.s.i.g.

The dry solids pass through a bottom drawoff device generally indicated at 20 and more specifically described in my U.S. Patent No. 2,658,031, such drawoff preferably including a series of vertical splitter plates so that there is a uniform flow of the particles throughout the reactor 10. I also provide a steam purging ring 22 supplied by steam line 24 which serves not only to purge all of the vapors from the discharging solids, but in addition serves to maintain a temperature and partial pressure effect below the disengager cone 12 so that there is no premature coking in the vapor outlet 14.

The dry coke particles discharge through the line 26 which extends to the elevated disengager 28. A relatively low pressure is maintained on this hopper by the control valve 30 so that the transfer of particles may be mechanically accomplished by the superior pressure in the reactor 10. The line 26 is preferably tapered and by throttling the discharge of particles from the open end of line 26 by limiting the rate of drawoff from disengager 28 by the setting of valve 32, the particles move in the line 26 in mass flow condition as more particularly described in my copending application Serial No. 412,803, filed February 26, 1954, now Patent No. 2,920,034 and as described hereinafter.

The flow of particles from the disengager 28 is preferably through the classifier 34 which may be provided with an internal screen 36 to separate out the largest particles which are removed through the outlet valve 38. The smaller sized particles are discharged into the reheater 40 through the line 42.

The reheater 40 which is operated at approximately atmospheric pressure, is supplied with air and a fuel gas through the lines 44 and 46, respectively, which discharge to burners 48 mounted in the upper wall, such burners being tangentially disposed and normally heating the particles by radiation and convection. Flue gases are removed through collector 49 and line 50 to the stack 52. The hot coke particles discharge in a substantially uniform manner through the outlet 54.

To obtain a suitable mass flow transfer of the particles from the outlet 54 of the reheater 40 at nearly atmospheric pressure to the higher pressure reactor 10, it is convenient to use tandem vessels 56 and 58 which are provided with valves 56a and 58a, such valves in turn being cyclically controlled by controller 60. The controller 60 also controls a pressure steam line 62 and a vent valve 78 to alternately pressure and depressure chamber 56. With the lift chamber 58 at 100 p.s.i.g. and the coke reheater 40 at 2 p.s.i.g., the coke flow in the lift lines 64 and 70 feeding the reactor is continuous. The lock chamber 56 serves to deliver the solids from the low pressure reheater 40 to the high pressure lift chamber 58 without causing pressure fluctuations in the rest of the system. The coke level in the reheater 40 and in the lift chamber 58 fluctuates slightly with the intermittent delivery of solids to and from the lock chamber 56.

The lift lines operate at all times in a fully dense packed manner due to the fact that the reactor 10 always contains the maximum amount of solids. As a result the mass flow materially differs from prior types of "fluid" flow. If for example, in a fluid type flow system, the gas rate is increased with a constant solids rate, the flow line density decreases and the pressure drop decreases. In the mass flow operation as heretofore described, there is no change in flow line density because of the packed nature of the particles and with the increase in gas rate there is an increase in pressure drop.

The complete control of flow is thus accomplished by the valve 32 which can be set at any desired rate within the limits of the flow of the apparatus. The flow from the bottom of lift chamber 58 and from the bottom of the intermediate disengager 66 will be at the same rate as the rate of withdrawal from the bottom of the reactor 10 into line 26 and into the top disengager 28. Preferably the steam line 62 may be fed from refinery steam line of 120 to 150 p.s.i.g. pressure which is normally enough for the continuous elevation of the particles to the required height. A sixty foot sealing and lifting line 26 requires a minimum pressure of about 30 p.s.i.g. to operate and it will effectively resist high differential pressures even up to 200 p.s.i.g., without excessive gas flows.

The intermediate disengager 66 is particularly beneficial because of the greater requirements for lifting gas or steam at the bottom of line 64 than at the intermediate section of the line. The excess gas under suitable control at 67 may be reintroduced to the purge ring 22 by means of line 68. This disengager is located at a vertical position such as that the steam so disengaged is at sufficient pressure for reuse in the bottom of the reactor 10 in steam inlet 22. The high superheat of this steam leaving disengager 66 from contact with the hot solids is thus also advantageously utilized. The amount of steam reused and saved by this arrangement will amount to ⅓ to ⅔ of the total steam flowing through lift line 64, depending on the relative pressures and the structural design of the system.

With proper structural arrangement, the pressure in reactor 10 is more than sufficient to overcome the pressure drop required for operation of the reactor outlet lift line 26. Since the oil vapors are withdrawn at an intermediate level and there is an upward flow of stripping steam from steam inlet 22, oil vapors are prevented from leaving the reactor through line 26 with the solids. Part of the total steam introduced into the reactor bottom will therefore flow with the solids through line 26 and will provide the lifting medium requirements of this line. Since the reactor 10 is at elevated pressure, maintained by controlling the pressure in the oil vapor drawoff line 14, and since the reactor always contains the maximum inventory of solids, it is not necessary to provide displacement steam equivalent to the volume of the flowing solids particles. Also, the steam requirement for displacing the void volume between the solids particles has been provided in order to do the stripping in the lower section of the reactor, below the vapor drawoff 14. The net steam required for operating the lift line 26 is therefore very small, amounting to only the steam required to produce the required pressure drop in the line.

It should be noted that this use of the dense packed or mass flow line 26 for a combination of solids transport and high differential pressure sealing is unique and highly advantageous. It makes it possible to operate the reactor at elevated optimum pressures while maintaining the reheater at essentially atmospheric pressure, thus minimizing its cost and the work required for supplying combustion air. Differential pressure controllers are eliminated and the long sealing legs common in catalytic cracking processes are unnecessary. A practical, safe and easily operated design is obtained which reduces the overall height of the equipment to less than one half that required for conventional systems. These economies and advantages can be obtained at pressure differentials that are impossible with the usual methods of solids circulation such as dilute phase lift lines or fluidized transport. The relative pressures given as an example above are in no way limiting as far higher differentials may be obtained at moderate increase in power requirement for lift lines. The system is applicable to a wide range of processes such as catalytic cracking, catalytic hydroforming and in fact any solids contact reaction. In many cases the use of elevated reactor pressure is absolutely essential to the required result.

The apparatus also includes certain subordinate features including a drawoff at 75 of a small part of the large particles through the secondary screen 36a, such materials being passed in part through the crusher 76 and thence returned to the reheater 40. The net amount of coke may be drawn off through line 79 which is in communication with the drawoff line 75.

The manner of applying the liquid charge is as more particularly described in my U.S. Patent No. 2,701,788 which more specifically includes the provision of an oil charge line 85 by which the oil may be introduced to the moving particles passing through line 70 as by a series of inlets indicated at 86. Alternatively the charge may be introduced at 87 to the particles just before entering the reactor 10.

Since the oil is usually charged to the mixing zone at about 650 to 850° F. and the circulating coke may be at a temperature of 850 to 1100° F., upon initial contact, vaporization and rapid cracking occurs. It has been found that if the resulting foam of unvaporized oil and vapors is forced to take a pressure drop of at least 20" of water in passing through the restricted column of coke below the feed point, uniform contact and uniform wetting of the coke particles are assured since the vapor-liquid mixture is forced to travel through all the bed void passages in this lower section of the mixing zone. Passage of oil vapors backward through the coke feed line is prevented, of course, by the forward flow of steam under the differential pressure between the intermediate disengager 66 and the reactor 10. Since the feed leg 70 and the mixing zone 10 are completely filled with coke, no surface is present which is not continually scrubbed by flowing coke particles. This effectively eliminates coke formations on anything but the coke particles and this is an important feature of this invention and a departure from the prior art.

*Summary of operating data*

|  | Temperature, ° F. | Pressure, p.s.i.g. | Time, Minutes |
|---|---|---|---|
| Oil Charge | 650–850 | | |
| Coke Entering Reactor | 850–1100 | | |
| Reactor | | 15–100 | |
| Coke Through Reactor | | | 5–40 |
| Reheater | | Atmospheric | |
| Forwarding Steam in Lift Line. | | 100 | |

A preferred example of the application of a heavy hydrocarbon to my process is as follows:

Charge—Shamrock Pitch—gravity 20.1 A.P.I.
    I.B.P., 450° F.
    2.4% at 749° F.
    Flash point, 535° F.
    Pour point, 60° F.
    Viscosity, 53.5 (S. Furol 210° F.)
    Ramsbottom carbon, 10.8%
Particle material—Petroleum Coke
    Size, average: 0.157–0.25 inch
    Bulk density, 65 lbs./cu. ft.
    Interparticle voids, 31%
    Intraparticle voids, 4%
Procedure—3.0 gal./hr. of oil charge was introduced at 750° F. to the coking reactor through which 500 lb./hr. of coke was circulated. The coke to oil ratio was 21:1.
    Coke particle inlet temperature—1020° F.
    Coke particle outlet temperature—980° F.

Average residence time of coke particles—23 minutes
Reactor operating pressure—40 p.s.i.g.
Product vapor temperature—902° F.
Product—Gas—13.2 wt. percent
Liquid product—75.7 wt. percent
Coke—11.1 wt. percent While I have shown and described a preferred form of embodiment of my invention, I am aware that modifications may be made that are within scope and spirit of the disclosure herein and of the claims appended hereinafter.

I claim:

1. In a continuous method of converting residual hydrocarbons in a closed system into coke and lighter hydrocarbons in which solid particles of at least 1/16 inch major dimension are heated in a reheat zone to a temperature in the range of 850–1100° F. and are conveyed to a reaction zone maintained at superamospheric pressure for passage therethrough by gravity as a relatively deep, unagitated, free-flowing homogeneous and continuous column and on which a charge comprising residual hydrocarbons substantially in liquid phase and below the temperature of incipient coking is coated so that the initially unvaporized portion of the charge will move downwardly with said column on said particles and in which the particles of the moving column are retained in said reaction zone after said charge coating and without other addition of heat or further addition of charge for at least 5 minutes and for a time sufficient to convert the initially unvaporized portion of the charge into dry solid coke adhering to the particles of said column and vaporous lighter hydrocarbons solely by the heat supplied by the heated particles forming said column and in which the vaporous lighter hydrocarbons are removed from said moving column in the reaction zone, said coke bearing particles being removed from said reaction zone and conveyed to said reheat zone in said closed system, the improvement which comprises: introducing an inert stripping gas into said reaction zone to strip said vaporous hydrocarbons from said particles; removing said vaporous hydrocarbons and a portion of said inert stripping gas from said reaction zone; conveying said particles and adhering coke together with the remaining portion of said inert stripping gas through a confined lift leg to an elevated hopper while substantially preventing the passage of said vaporous hydrocarbons through said lift leg, said remaining portion of said inert stripping gas providing the lifting medium requirements for said lift leg; intercepting the upward cone of flow angle of the dense packed solids at the hopper exit of the lift leg thereby maintaining maximum particle packing density conditions throughout said lift leg; and throttling the withdrawal rate of the particles from said hopper to the reheat zone so as to maintain a substantially constant and continuous inventory and uniform flow of solids in the column in said reaction zone and lift leg.

2. In a continuous method of converting residual hydrocarbons in a closed system into coke and lighter hydrocarbons in which solid particles of at least 1/16 inch major dimension are heated in a reheat zone to a temperature in the range of 850–1100° F. and are conveyed to a reaction zone maintained at superatmospheric pressure for passage therethrough by gravity as a relatively deep, unagitated, free flowing homogeneous and continuous column and on which a charge comprising residual hydrocarbons substantially in liquid phase and below the temperature of incipient coking is coated so that the initially unvaporized portion of the charge will move downwardly with said column on said particles and in which the particles of the moving column are retained in said reaction zone after said charge coating and without other addition of heat or further addition of charge for at least 5 minutes and for a time sufficient to convert the initially unvaporized portion of the charge into dry solid coke adhering to the particles of said column and vaporous lighter hydrocarbons solely by the heat supplied by the heated particles forming said column and in which the vaporous lighter hydrocarbons are removed from said moving column in the reaction zone, said coke bearing particles being removed from said reaction zone and conveyed to said reheat zone in said closed system, the improvement which comprises; withdrawing the reheated particles from said reheat zone and passing said particles by gravity into a forwarding zone; introducing an inert gas into said forwarding zone to convey said reheated particles through a lift leg to the upper portion of the reaction zone, said reheated particles and inert gas passing through an intermediate disengaging zone during conveyance to said reaction zone to disengage and withdraw a portion of said inert gas therefrom; coating the hydrocarbon charge on said reheated particles and passing the coated particles of said column through said reaction zone to convert said charge to coke and vaporous lighter hydrocarbons; introducing an inert gas including the portion of inert gas withdrawn from said intermediate disengaging zone into said reaction zone to strip said vaporous hydrocarbons from said particles; removing said vaporous hydrocarbons and a portion of said inert stripping gas from said reaction zone; conveying said particles and adhering coke together with the remaining portion of said inert stripping gas through a second lift leg to an elevated hopper while substantially preventing the passage of said vaporous hydrocarbons through said lift leg, said remaining portion of said inert stripping gas providing the lifting medium requirements for said lift leg; intercepting the upward cone of flow angle of the dense packed solids at the hopper exit of said second lift leg thereby maintaining maximum particle packing density throughout said lift leg and reaction zone; and throttling the withdrawal rate of the particles from said hopper to said reheat zone so as to maintain a substantially constant and continuous inventory and uniform flow of solids in the column in said reaction zone and in said second lift leg.

3. The method of converting residual hydrocarbons as claimed in claim 1 wherein the inert gas pressure in the reaction zone is in the range of 15 to 100 p.s.i.g. and is more than the pressure drop in the confined lift leg plus the gravitational weight of the solids in said lift leg and less than the pressure drop through the reaction zone plus the effect of inlet pressure at the upper portion of the reaction zone.

4. The method of converting residual hydrocarbons as claimed in claim 2 wherein the liquid hydrocarbon charge is introduced into the dense packed particles during conveyance from the forwarding zone to the reaction zone.

5. In a continuous method of converting residual hydrocarbons in a closed system into coke and lighter hydrocarbons in which solid particles of at least 1/16 inch major dimension are heated in a reheat zone to a temperature in the range of 850–1100° F. and are conveyed to a reaction zone maintained at superatmospheric pressure for passage therethrough by gravity as a relatively deep, unagitated, free-flowing homogeneous and continuous column and on which a charge comprising residual hydrocarbons substantially in liquid phase and below the temperature of incipient coking is coated so that the initially unvaporized portion of the charge will move downwardly with said column on said particles and in which the particles of the moving column are retained in said reaction zone after said charge coating and without other addition of heat or further addition of charge for at least 5 minutes and for a time sufficient to convert the initially unvaporized portion of the charge into dry solid coke adhering to the particles of said column and vaporous lighter hydrocarbons solely by the heat supplied by the heated particles forming said column and in which the vaporous lighter hydrocarbons are removed from said moving column in the reaction zone, said coke bearing particles being removed from said reaction zone and conveyed to said reheat zone in said closed system, the improvement which comprises: introducing an inert stripping gas into said reaction zone to strip said vaporous hydrocarbons from said particles; removing said vaporous hydrocarbons and a portion of said inert stripping gas from said reaction zone; conveying said particles and adhering coke together with the remaining portion of said inert stripping gas through a confined lift leg to an elevated hopper while substantially preventing the passage of said vaporous hydrocarbons through said lift leg, said remaining portion of said inert stripping gas providing the lifting medium requirements for said lift leg; intercepting the upward cone of flow angle of the densely packed solids at the hopper exit of the lift leg; throttling the withdrawal rate of the particles from said hopper to the reheat zone; and passing the particles by gravity through the reheat zone to a forwarding chamber and conveying said particles by an inert gas from said forwarding chamber through a second lift leg to the reaction zone, said particles flowing in dense packed condition having substantially the same packing density in upward as well as downward flow, the pressure drop in the lift legs being approximately the difference in pressures of the two zones whereby said zones are sealed from one another.

6. In a conversion system wherein a granular contact material is caused to move through an enclosed cyclic path including a high pressure contacting zone and a lower pressure contacting zone having its point of contact material entry at an elevation substantially above the point of contact material exit from the higher pressure zone and wherein the contact material moves downwardly through at least a portion of each of said zones as a compact bed and wherein the pressure differential between said zones is greater than the value of the calculated head of a compact column of said contact material equal in height to the elevation differential between said points of entry and exit, the method for effecting continuous transfer of the contact material from the higher pressure zone to the zone of lower pressure which comprises: permitting the contact material to be forced upwardly as a confined unobstructed compact lift stream extending from the lower section of said higher pressure zone to a location from which it may flow by gravity onto the bed in said low pressure zone by the gaseous pressure differential between said zones, whereby the gaseous pressure on the contact material is gradually reduced during its transfer and imposing a restriction to the flow of contact material issuing from said confined lift stream to maintain the material in compacted condition within said stream.

7. In a conversion system wherein a granular contact material is caused to move through an enclosed cyclic path including a high pressure containing zone and a lower pressure contacting zone having its point of contact material entry at an elevation substantially above the point of contact material exit from the higher pressure zone and wherein the contact material moves downwardly through at least a portion of each of said zones as a compact bed, the method for effecting continuous transfer of the contact material from the higher pressure zone to the zone of lower pressure which comprises: maintaining the pressure in the higher pressure zone above that in the lower pressure zone by an amount at least greater than the value of the calculated head of a compact column of said contact material equal in height to the elevation differential between said points of entry and exit, allowing the contact material to be forced upwardly as a confined unobstructed compact lift stream extending from the lower section of said higher pressure zone to a location from which it may flow by gravity onto the bed in said low pressure zone by the gaseous pressure differential between said zones, whereby the gaseous pressure on the contact material is gradually reduced during its transfer and imposing a restriction to the flow of contact material issuing from said confined lift stream to maintain the material in compacted condition within said stream.

References Cited by the Examiner

UNITED STATES PATENTS

| | | | |
|---|---|---|---|
| 2,684,930 | 7/1954 | Berg | 196—52.2 |
| 2,684,872 | 7/1954 | Berg | 196—52.2 |
| 2,684,873 | 7/1954 | Berg | 196—52.2 |

DELBERT E. GANTZ, *Primary Examiner.*

J. BAILEY, A. M. BOETTCHER, ALPHONSO D. SULLIVAN, *Examiners.*

R. E. STRAUSS, M. AVIN, H. LEVINE,
*Assistant Examiners.*